United States Patent [19]

Adams

[11] Patent Number: 4,762,002

[45] Date of Patent: Aug. 9, 1988

[54] PROBE ARRAY FOR ULTRASONIC IMAGING

[75] Inventor: Darwin P. Adams, Guilford, Conn.

[73] Assignee: Picker International, Inc., Cleveland, Ohio

[21] Appl. No.: 935,582

[22] Filed: Nov. 26, 1986

[51] Int. Cl.⁴ ............................................ G01N 29/04

[52] U.S. Cl. ....................................... 73/625; 128/660

[58] Field of Search ................. 73/620, 625, 628, 629, 73/633, 644, 618, 621, 641; 128/660

[56] References Cited

U.S. PATENT DOCUMENTS

| | | | |
|---|---|---|---|
| 4,248,090 | 2/1981 | Glenn | 128/660 |
| 4,391,281 | 7/1983 | Green | 128/660 |
| 4,543,960 | 10/1985 | Harui et al. | 128/660 |
| 4,579,122 | 4/1986 | Shimizu et al. | 128/660 |
| 4,579,123 | 4/1986 | Chen et al. | 128/660 |
| 4,615,330 | 10/1986 | Nagasaki et al. | 128/660 |
| 4,649,926 | 3/1987 | Abbott et al. | 128/660 |
| 4,676,106 | 6/1987 | Nagai et al. | 73/625 |
| 4,692,731 | 9/1987 | Osinga | 335/299 |

*Primary Examiner*—John Chapman
*Attorney, Agent, or Firm*—Watts, Hoffmann, Fisher & Heinke

[57] ABSTRACT

An ultrasonic transducer probe assembly. The assembly includes a multiple segment transducer truncated along opposed edges to define an elongated transducer shape which is pivoted about a pivot axis coincident with the transducer. The resulting pivoting movement of the transducer allows a smaller dimension probe assembly housing with only limited diminution of control over ultrasonic depth of field and resolution. A multiconductor cable routes energizing and monitoring signals to and from the transducer array. The multiple conductors needed to carry these signals are arranged in a geometric configuration to enhance the signal carrying characteristics of the cable.

13 Claims, 4 Drawing Sheets

PROBE ARRAY FOR ULTRASONIC IMAGING

DESCRIPTION

1.Technical Field

The present invention relates to a hand-held ultrasonic imaging probe. Diagnostic ultrasound imaging systems utilize piezoelectric transducer elements that convert electronic energy into mechanical movement to direct ultrasonic waves into a patient. Such systems utilize an ultrasonic transducer, imaging electronics, and a display. The imaging electronics actuate the transducer for propagation of ultrasonic energy into a patient's body. Within the body, the ultrasonic energy echoes or bounces off structures within the patient and returns to the transducer. The imaging electronics then process electrical output signals from the transducer to present a visual indication of the internal structure of the patient.

2. Background Art

A relatively recent improvement in ultrasonic transducer design is the utilization of a transducer array having multiple annular segments concentric about a center point of the ultrasonic transducer. U.S. Pat. No. 4,537,074 to Deitz entitled "Annular Array Ultrasonic Transducers" discloses one such transducer array. It is known to pivotally mount such an annular array of transducer segments to cause ultrasonic energy emitted by the transducer to scan across a section of the patient. Use of a plurality of individually energized annular segments allows a transducer focal spot to be controlled. This is accomplished by applying appropriate electronic delays to the energization signals driving the transducer and/or sensed signals coming from the transducer. Use of ultrasonic transducers employing multiple segment arrays provide high resolution and improved depth of field in the displayed image.

One of the earliest ultrasound probes having an annular transducer array was developed and marketed by Xerox. This system used a large aperture annular transducer array that was scanned by an oscillating ultrasonic mirror. The resultant structure was large and indeed so large that a separate gantry was required to support the ultrasonic probe.

A hand-held annular design transducer was later marketed by Technicare. This design utilized a smaller transducer facing an oscillating mirror. The performance of this design was somewhat limited due to the small size of the transducer array.

The state of the art in ultrasonic imaging therefore involves some compromises. Small hand-held units with small transducers have less focusing capability. Large, bulky units which utilize larger transducers have the advantage of higher resolution, but are difficult to position and maneuver next to a patient. It is therefore one object of the invention to provide high resolution, good depth of field ultrasonic images using a compact ultrasonic probe.

DISCLOSURE OF INVENTION

An ultrasonic transducer probe assembly constructed in accordance with the invention includes a number of individually energizable transducer segments arranged in a compact probe unit. This is accomplished using a truncated, multiple segment transducer and a mechanism for pivoting the transducer inside a compact probe housing. The cable carrying the signals to and from the pivoting transducer flexes many times a second. An additional aspect of the invention features a new cable adapted to withstand this flexing.

An ultrasonic probe assembly of the invention includes a generally tubular housing having an ultrasonic window. An ultrasonic transducer is mounted within the housing to face the ultrasonic window and includes a number of transducer segments arranged concentrically about a transducer center. An inner grouping of the transducer segments are annular and an outer grouping of the multiple transducer segments are truncated annular segments which in combination with the inner grouping form an elongated transducer. A drive member mounted within the housing is coupled to the elongated transducer for rocking the transducer about a pivot axis.

The pivot axis is preferably near the housing window. This reduces the amount of transducer movement during patient scanning. Since the transducer is truncated, the size of the housing window can be reduced and the combination of the truncated transducer, a smaller ultrasonic window, and the choice of pivoting axis for the transducer combine to produce a highly efficient compact ultrasonic probe design.

The truncated segment transducer design reduces resolution in a non-scanned plane but maintains resolution in the scanned plane. Within limits, the image resolution increases with probe aperture. It has been shown by computer simulation of a probe constructed in accordance with the invention that the scanned plane resolution and sidelobe performance remain approximately that of an annular transducer array. Computer modeling of the truncated probe array suggests a reduction in width of up to 50% in a non-scanning plane of the annular array causes only a small reduction in overall performance of the ultrasonic transducer.

The location of the transducer pivot axis effects the dimensions of the acoustic window. By moving the pivot plane forward to a location either coincident with or ahead of the transducer, the scan plane width of the ultrasonic window is reduced.

A preferred embodiment of the invention utilizes seven transducer segments all individually energized to produce an adjustable focus control. When seven segments are individually energized, seven conductors must be routed into the probe housing from an exterior control circuit. Another aspect of the invention is the utilization of a cable comprised of a number of conductors uniquely organized within a bundle. Certain ones of the multiple conductors carry control signals and other conductors are grounded. In accordance with the unique construction of the signal carrying bundle, each control signal carrying conductor is bounded by a ground conductor to reduce induced signal cross talk between conductors.

From the above it is appreciated that an object of the invention is a compact design, high-performance ultrasonic probe assembly utilizing scanning techniques that minimize the size of the probe while maintaining imaging performance. These and other objects, advantages and features of the invention will become better understood when the detailed description of a preferred embodiment of the invention is described in conjunction with the accompanying drawings.

BEST MODE FOR CARRYING OUT THE INVENTION

Figure 1:
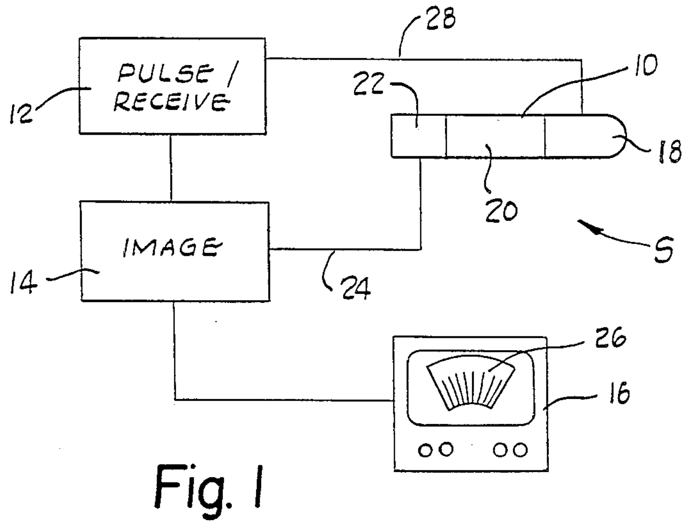
FIG. 1 is a block diagram of an ultrasonic scanning system.

FIG. 1 illustrates an ultrasonic imaging system S incorporating the present invention. The system includes a hand-held ultrasonic probe 10, circuitry 12 for both pulsing and receiving signals from the probe, imaging circuitry 14, and display apparatus 16. The system S propagates ultrasonic energy into a subject (not shown). The system responds to ultrasonic echoes thereby generated to produce a sector image 26 corresponding to the pattern of received ultrasonic echoes and indicating internal structure and/or condition of the subject's body.

The probe 10 includes an ultrasonic transducer generally indicated at 18, a motor 20 for mechanically oscillating the transducer, and an encoder 22 for providing a substantially instantaneous indication of the azimuthal orientation of the transducer.

The pulse/receiving circuitry 12 directs electrical pulsing signals over a multi-conductor cable 28 to the transducer 18, causing the transducer to propagate ultrasonic energy into the subject body. When ultrasonic echoes occur at tissue interfaces within the subject's body, some of the echoes are propagated back to the transducer. In response to the echoes, the transducer produces electrical output signals which are detected by the circuitry 12.

The pulse/receive circuitry 12 transmits the echo indicating transducer output signals to the imaging circuitry 14. The imaging circuitry 14 also receives a signal over a conductor 24 coupled to the encoder 22 indicating the instantaneous orientation of the transducer 18.

The imaging circuitry 14 processes the detected echo indicating signals and the orientation indicating signal from the encoder to produce, on the display apparatus 16, which comprises a CRT display set, a sector image 26 describing internal subject body structure.

The system S corresponds generally to the imaging system disclosed in pending U.S. patent application Ser. No. 740,565 to Molnar et al entitled "Ultrasonic Mechanical Sector Scanning Transducer Probe Assembly" filed June 3, 1985. The disclosure of that application is incorporated herein by reference.

Figure 2:
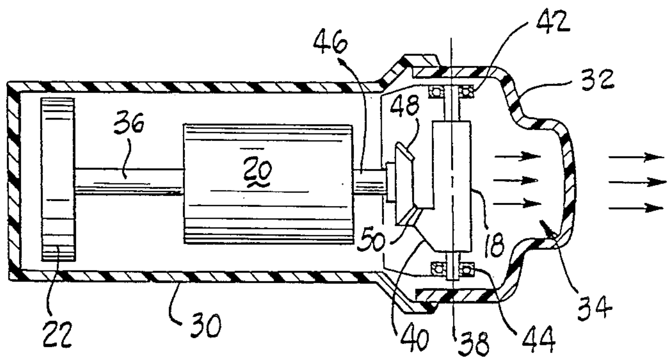
FIG. 2 is a schematic of a ultrasonic probe assembly directing ultrasonic energy through a scanning window.

The probe 10 includes a housing comprising a first cylindrical portion 30 made of a generally rigid material, such as durable plastic, closed at the left hand end as viewed in FIG. 2. The probe 10 also includes a ultrasound transmitting window 32 that fits within a flared opening of the cylindrical portion 30. The window 32 is made of a polyethylene which facilitates the passage of ultrasonic energy between the transducer and the exterior of the housing. In use, the window 32 is held against the subject's body in order to couple ultrasonic energy emmanating from the probe to the body. The interior of the probe 10 in the vicinity of the transducer 18, indicated at reference character 34, defines a cavity filled with a liquid acoustic couplant material.

The motor 20 comprises a brushless D.C. motor having very low inertia. The motor 20 is operated by known servo power circuitry (not shown) in a limited rotation mode. Angular displacement of the motor is approximately ±45° with respect to a predetermined center position.

The encoder 22 is an optical encoder coupled rigidly to the motor 20 by a shaft 36. It is a three channel encoder preferably having two data channels of 512 cycles per channel, and an index channel.

The transducer 18 is pivotally mounted for rotational movement about an axis 38. More specifically, the transducer 18 is mounted to a transducer assembly 40 which is journalled in bearings 42, 44 for rotation about the axis 38, which is substantially perpendicular to the longitudinal axis of the tubular housing portion 30.

The assembly 40 is driven by a motor drive shaft 46 by way of a pair of beveled gears 48, 50. The bevel gear 48 is mounted axially on the shaft 46, the bevel gear 50 being coupled to the transducer assembly 40. A seal (not shown) disclosed in the copending application to Molnar prevents fluid from contacting the motor bearings that support the shaft 46.

Figure 3:
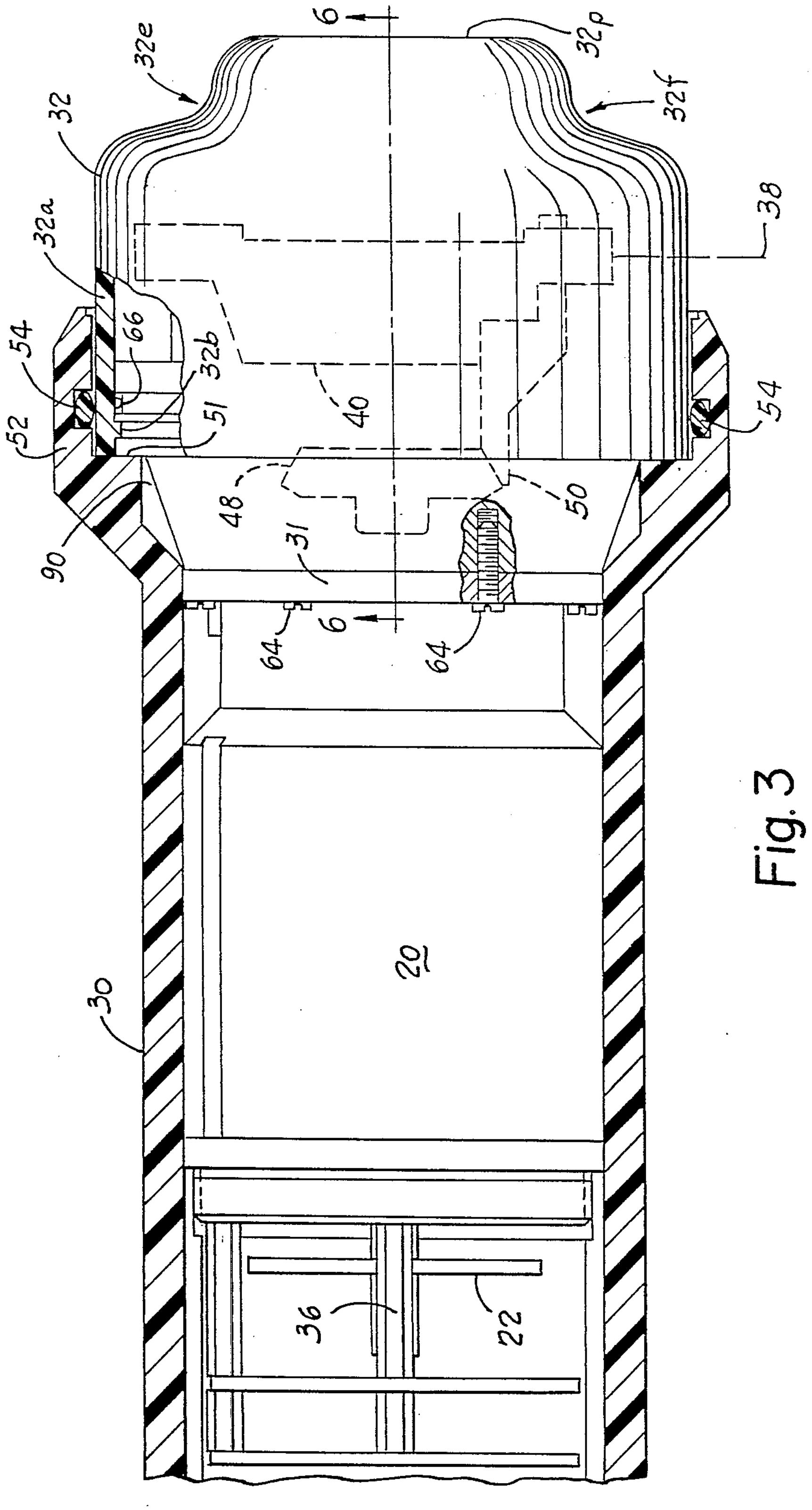
FIG. 3 is an enlarged partially sectioned view of the FIG. 2 ultrasonic probe assembly.

FIG. 3 illustrates in detail a probe assembly embodying the present invention and corresponding to that shown in FIG. 2. As seen in FIG. 3, an annular shaped housing end 32*a* of the window 32 defines an enclosure that fits within an annular flared recess in the housing portion 30 and abuts a annular flange or shoulder 51 defined by the housing 30. The housing 30 also defines a annular slot 52 for receipt of an O-ring 54 that prevents ultrasound coupling material that is applied to the patient from reaching the housing interior.

Figure 4:
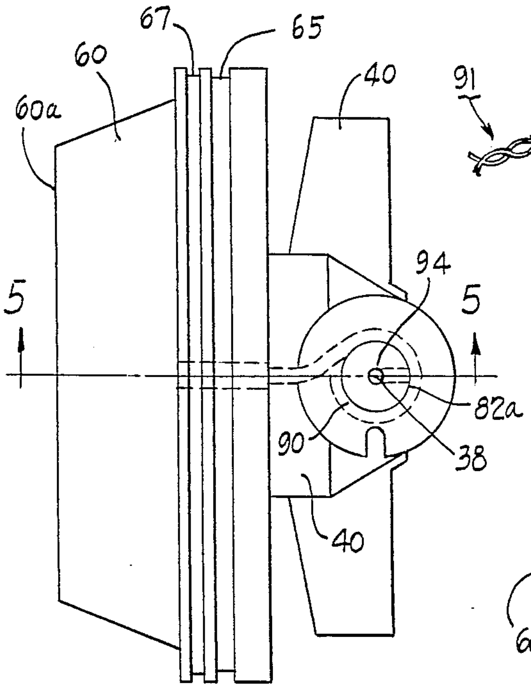
FIG. 4 is an elevation view of an ultrasonic transducer mounting assembly.

Radially inward from an annular portion of the window 32 is a stationary transducer mounting member 60 (FIG. 4) that pivotally supports the transducer assembly 40. The transducer mounting member 60 defines a through passage 62 for accommodating the bevel gear 48 and motor drive shaft 46. The mounting member 60 is rigidly attached to a motor housing 31 in the housing 30 by threaded connectors 64 engaging a threaded opening in an endface 60*a* of the mounting member 60.

As mentioned above, a region 34 between the window portion 32 and the transducer assembly 40 is filled with a liquid couplant. To prevent this couplant from leaking past the mounting member 60 to the region of the servo motor 20, an annular groove 65 in the mounting member 60 supports a second O-ring 66 that seals couplant within the region 34. A second annular groove or recess 67 in the mounting member 60 is engaged by a flange 32*b* of the window 32 to couple the window 32 to the housing portion 30. Inward pressure on the annular portion 32*a* of the window 32 by the compressed O-ring 54 keeps the flange 32*b* seated in the groove 67.

Transducer Construction

Figure 7:
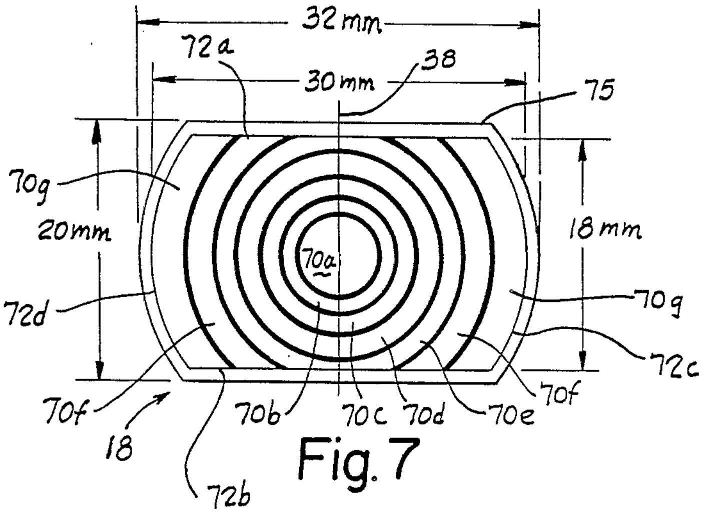
FIG. 7 is a plan view of a multiple segment transducer constructed in accordance with the invention.
Figure 8:
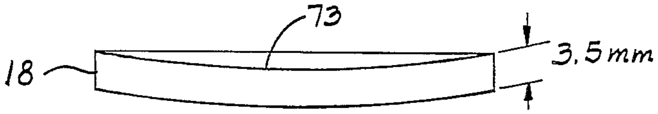
FIG. 8 is a elevation view of the transducer of FIG. 7.
Figure 9:
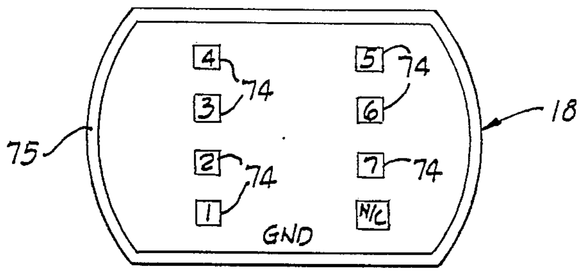
FIG. 9 is a schematic of the ultrasonic transducer showing a signal energization contact arrangement for the multiple segment array of FIG. 7.

FIGS. 7-9 illustrate a transducer 18 constructed in accordance with the invention. The illustrated transducer is constructed from multiple transducer segments or elements 70*a*-70*g*. As known and practiced in the prior art construction of piezo-electric transducers, a face plate of the transducer (not shown) is plated onto the transducer elements 70*a*-70*g* and is maintained at electric ground. The face plate is constructed from an electrically conductive material which is transparent to ultrasonic waves emitted by the transducer 18.

A first center transducer segment 70*a* is disk shaped as seen from the plane of the housing window 32. The next three transducer segments 70*b*-70*d* comprise annular piezo-electric elements symmetrically oriented about the center element 70*a*. Three additional segments 70*e*-70*g* comprise portions of annular members that are truncated along edge portions 72*a*, 72*b* of the transducer 18. The edges 72*a*, 72*b* approximate chords of a circle having a radius equal to the outer radius of the outermost transducer segment 70*g*. Each of the segments 70*a*-70*g* is spaced apart from adjacent elements by an acoustically absorptive material known in the prior art. A transducer holder 75 borders the segments 70*a*-70*g* and is also constructed from an acoustically absorptive material.

As seen in FIG. 8, the transducer 18 is slightly concave and in particular, a piezo-electric transducer surface 73 facing the window 32 has a focal length of approximately 90 millimeters. Seven electrical contact pads 74 coupled to the segments 70*a*-70*g* are illustrated in the rear elevation view of the transducer 18 of FIG. 9. These contact pads are insulated from a transducer face plate maintained at a ground potential. The physical dimensions of the transducer 18 are noted in FIG. 7. The transducer 18 is fixedly attached to the transducer mounting assembly 40 within a recess 40*a* (FIG. 5) defined by that assembly.

Figure 6:
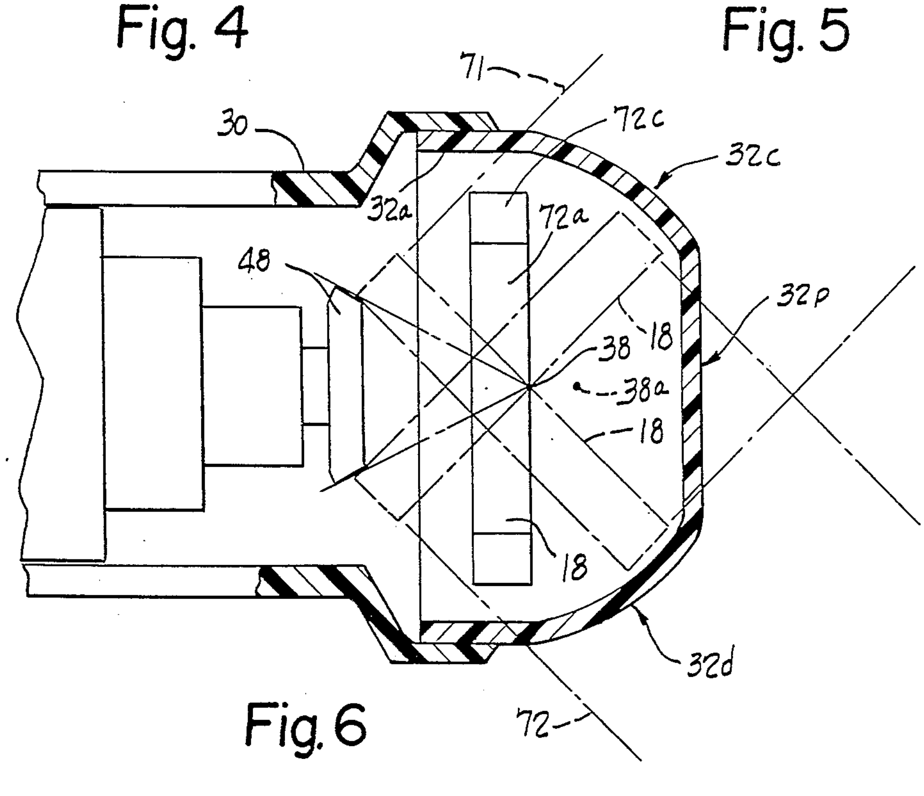
FIG. 6 is a partially sectioned schematic representation as seen from the plane 6—6 in FIG. 3 showing pivotal scanning of an ultrasonic transducer.

Pivoting motion of the transducer 18 about the pivot axis 38 defined by the two bearings 42, 44 is illustrated in FIG. 6. The transducer 18 is shown pivoting ±45° to generate acoustic waveforms 71, 72 traveling through the window 32 at 90° angles. It should be appreciated that the transducer segments 70*a*-70*g* are pulsed as the pivoting occurs so that acoustic signals sweep out a complete sector scan of a patient.

Window Shape

As seen in FIG. 6, the amount of pivoting action imparted on transducer 18 by the motor 20 is limited to ±45°. Thus, the window 32 is flattened on one end to define a blunt, generally planar probe end 32*p*. The probe end 32*p* is bounded by first and second side portions. First side portions are defined by first and second arcuate side regions 32*c* and 32*d*. As transducer pivoting takes place, a curved edge 72*c* of the transducer 18 defined by the outermost truncated annular segment 70*g* rotates in close proximity to the first arcuate side region 32*c*. The second arcuate side region 32*d* defines a region for rotation of a second curved edge 72*d* of the transducer.

Figure 11:
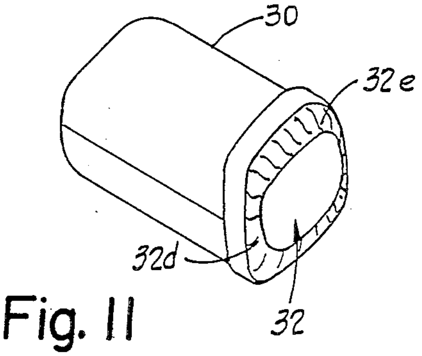
FIG. 11 is a perspective view of the probe assembly of FIG. 2 showing a shape of an ultrasound transmitting window.

In addition, as seen most clearly in FIGS. 3 and 11, the fact that transducer 18 is truncated, top and bottom, to define less than a full disk of multiple segments, the planar probe end 32*p* is only wide enough to accommodate movement of the truncated transducer 70. The second side portions of the window 32 are therefore pinched to define first and second pinched-in side regions 32*e*, 32*f*. As seen in FIG. 3, each of the pinched-in side regions form a convex, then concave, then convex surface between the planar probe end 32*p* and the annular housing end 32*a*. This window construction takes up less space than prior art designs and can more easily be placed against difficult to access areas such as beneath a patient's ribs.

Pivot Axis Location

An additional factor in reducing the size of the window 32 is the choice of pivot axis 38. The axis 38 passes through the transducer ground plane that fronts the array of segments. The transducer 18 rotates through a relatively small volume of the probe assembly since its side to side motion is minimal. An alternate axis 38*a* (FIG. 6) could be chosen between the window 32 and the transducer 18. This would result in greater transducer movement but not greater width of the acoustic transmitting portions of the window 32. A pivoting axis coincident with or ahead of the transducer 18 therefore also contributes (see FIG. 6) to a reduced size of the window 32.

Signal Carrying Cable

Figure 5:
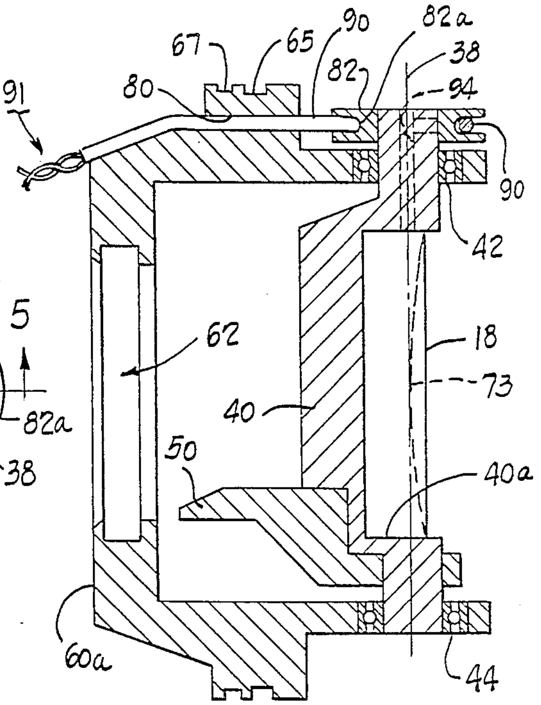
FIG. 5 is a view seen from the plane defined by the lines 5—5 in FIG. 4.

As seen most clearly in FIG. 5, the transducer mounting member 60 defines a through passage 80 for routing a cable 90 from inside the housing 30 through the mounting member 60 to a cable take-up mechanism 82. The cable take-up mechanism 82 is coupled to the transducer assembly 40 for rotation as the drive motor 20 oscillates the assembly 40 back and forth. The cable 90 (FIG. 10) is reeved about a groove 82*a* in the cable take-up 82. The cable take-up 82 defines an opening extending radially inward to a throughpassage 94 aligned with the pivot axis 38 of the transducer assembly 40. The passageway 94 extends along the pivot axis to the vicinity of the connecting pads 74 of FIG. 9. In that region, individual signal carrying conductors (FIG. 10) are electrically connected to the pads 74 coupled to individual segments 70*a*-70*g* of the transducer 18. The take-up mechanism 82 accommodates a slack in the cable 90 so that the oscillating motion of the transducer 18 does not break the cable 90 as it is repeatedly flexed back and forth. Inside the housing portion 30 the cable 90 mates with seven conventional signal carrying coaxial cables 91 which could not withstand the flexing and would take up much more space than the cable 90.

Figure 10:
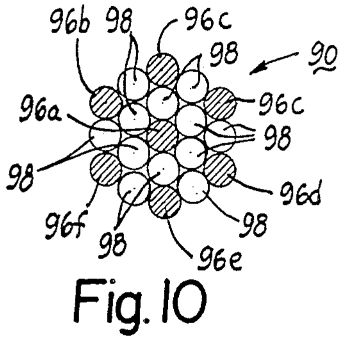
FIG. 10 is a section view of multiple signal carrying conductors bundled together for selectively energizing the transducer array of the invention.

The physical arrangement of individual signal carrying wires or conductors within in the cable 90 provides a compact, sturdy routing of transducer energization signals to the transducer. In the seven segment transducer of the invention, seven signal carrying wires are needed. In the FIG. 10 illustration, the cable 90 is seen to include 19 individual conductors, each coated with an insulation material. Seven signal carrying conductors 96*a*-96*g* are separated from each other by reference conductors 98 maintained at ground potential. The 19 conductors are constructed of commonly known "magnet" wire used in motor and relay coil windings. Each wire has a small diameter, typically 0.004 inches, so that the entire hexagonal bundle of 19 conductors shown in FIG. 10 has a width of only 0.02 inches. The arrangement of signal carrying conductors spaced from each other by the ground conductors 90 reduces crosstalk of induced signals created by the alternating current signals transmitted along the signal carrying wires. Typically, the entire bundle of 19 conductors is wrapped by a sheath (not shown) to facilitate routing of the cable 90 from within the housing 20 to the vicinity of the transducer 18.

While a specific embodiment of the invention has been described with a degree of particularity, it is the intent that the invention include all modifications and alterations from the disclosed design falling within the spirit or scope of the appended claims.

I claim:

1. An ultrasonic probe assembly comprising:

(a) a generally tubular housing;

(b) an ultrasonic transducer having multiple individually energizable segments, said transducer movably disposed within said housing;

(c) a drive shaft extending longitudinally within said housing coupled to said ultrasonic transducer for imparting motion to said ultrasonic transducer in response to motion of said drive shaft;

(d) power means for imparting motion to said drive shaft; and (e) electrically conductive means coupled to said transducer for connecting said transducer to external circuitry;

(f) said electrically conductive means including a bundle of individually insulated conductors including a center signal carrying conductor coupled to one of said individually energizable segments for carrying signals to and from the external circuit, a plurality of reference conductors surrounding the center conductor and maintained at a reference potential, and a plurality of additional signal carrying conductors spaced from said center signal carrying conductor by said plurality of reference conductors where each conductor of the plurality of signal carrying conductors is coupled to a different one of said individually energizable transducer segments

2. The probe assembly of claim 1 wherein said ultrasonic transducer comprises seven individually energizable segments and the conductive means comprises a center conductor separated from six additional signal carrying conductors by said reference conductors.

3. The probe asembly of claim 2 where each of the six additional signal carrying conductors is equally spaced in a circular arrangement and each additional signal carrying conductor is separated from two adjacent signal carrying conductors in said circular arrangement by a reference conductor.

4. The probe assembly of claim 2 where the seven individually energizable transducer segments comprise a center disk element, surrounded by three annular transducer segments, and portions of three additional annular transducer segments.

5. An ultrasonic probe assembly comprising:

(a) a generally tubular housing having an ultrasonic window;

(b) an ultrasonic transducer disposed within said tubular housing facing the ultrasonic window, said transducer comprising a number of piezo-electric transducer segments oriented to direct energy away from an ultrasound emitting transducer face through a fluid acoustic coupling to the window, said segments arranged concentrically about a center point, said segments including a disk-like center section, an inner grouping of annular segments surrounding said disk-like center section, and an outer grouping of truncated annular segments; said center section, annular segments, and truncated annular segments in combination forming an elongated transducer;

(c) drive means mounted within said housing coupled to said ultrasonic transducer for effecting rocking motion of said transducer about a pivot axis, said pivot axis located ahead of or substantially coincident with the ultrasound emitting transducer face;

(d) power means coupled to the drive means for energizing said drive means; and (e) means for coupling said transducer segments to external circuitry for sending and receiving diagnostic signals.

6. The probe assembly of claim 5 where a combination of the disk-like center transducer segment, the inner grouping of annular segments, and the outer grouping of truncated annular segments form a concave ultrasound emitting face bounded on opposite sides by parallel chords that intersect the truncated annular segments.

7. The probe assembly of claim 5 wherein the ultrasonic window comprises a cup that encloses the transducer at one end of the tubular housing, said cup defining an annular shaped housing end, a blunt, generally planar probe end coupled to the annular shaped housing end by curved side portions.

8. The probe assembly of claim 7 where the tubular housing flares outwardly in the region of the annular side portion of said ultrasonic window to define a region to accommodate the drive means within the housing.

9. The probe assembly of claim 7 where a section of the curved side portions forms a convex, then concave, and then convex surface between the planar probe end and the annular housing end.

10. The probe assembly of claim 7 wherein the transducer pivot axis is spaced from an inner surface of the blunt probe end by a distance less than one half the length of the elongated dimension of said transducer.

11. An ultrasonic probe assembly comprising:

(a) an elongated ultrasonic transducer having multiple separately energizable segments including a center disk transducer segment surrounded by multiple annular transducer segments truncated to define opposed generally parallel transducer edges and rounded edges at opposed ends of said elongated transducer;

(b) a drive shaft coupled to said ultrasonic transducer for imparting pivotal motion to said ultrasonic transducer about a pivot axis transverse to a width of said elongated transducer;

(c) power means for imparting motion to said drive shaft;

(d) a generally cylindrical housing supporting said ultrasonic transducer, said drive shaft and said power means; and (e) an ultrasound transmissive window enclosing the transducer within an acoustic coupling field at one end of the cylindrical housing, said window defining an annular window portion engaging the cylindrical housing a blunt, generally planar probe end for contacting a subject during an ultrasound study, and first and second curved side portions which couple the planar probe end to the annular shaped window portion, said first curved side portion defining first and second arcuate side regions to accomodate pivoting movement of the rounded edges of said transducer within the coupling fluid and said second curved side portion defining first and second pinched side regions to reduce the size of the planar probe end along the opposed generally parallel edges of said transducer.

12. The probe of claim 11 wherein the first and second pinched side regions form a convex, then concave and then convex surface between the planar probe end and the annular housing end.

13. The probe assembly of claim 11 wherein the transducer pivot axis is spaced from an inner surface of the blunt probe end of said window by a distance less than one half the length of the elongated dimension of said transducer.

* * * * *